(12) United States Patent
Jensen et al.

(10) Patent No.: US 9,638,798 B2
(45) Date of Patent: May 2, 2017

(54) IMAGING TRANSDUCER ARRAY

(75) Inventors: Henrik Jensen, Herlev (DK); Svetoslav Ivanov Nikolov, Herlev (DK)

(73) Assignee: B-K Medical Aps, Herlev (DK)

( * ) Notice: Subject to any disclaimer, the term of this patent is extended or adjusted under 35 U.S.C. 154(b) by 949 days.

(21) Appl. No.: 13/825,178

(22) PCT Filed: Sep. 20, 2010

(86) PCT No.: PCT/IB2010/002343
§ 371 (c)(1),
(2), (4) Date: Mar. 20, 2013

(87) PCT Pub. No.: WO2012/038770
PCT Pub. Date: Mar. 29, 2012

(65) Prior Publication Data
US 2013/0201798 A1    Aug. 8, 2013

(51) Int. Cl.
*G01S 15/00* (2006.01)
*G01S 15/89* (2006.01)
*B06B 1/06* (2006.01)
*G01S 7/52* (2006.01)

(52) U.S. Cl.
CPC .......... *G01S 15/89* (2013.01); *B06B 1/0629* (2013.01); *G01S 7/52047* (2013.01); *G01S 15/8915* (2013.01); *G01S 15/8945* (2013.01)

(58) Field of Classification Search
USPC ....................................................... 367/140
See application file for complete search history.

(56) References Cited

U.S. PATENT DOCUMENTS

| 4,516,838 A | 5/1985 | Bademian |
| 5,520,184 A | 5/1996 | Ri |
| 6,597,085 B2 | 7/2003 | Lee et al. |

(Continued)

FOREIGN PATENT DOCUMENTS

| JP | 62-144500 | 6/1987 |
| JP | 2004-242788 | 9/2004 |

(Continued)

OTHER PUBLICATIONS

M. H. Bae, I. H. Sohn, S. B. Park. "Grating Lobe Reduction in Ultrasonic Synthetic Focusing". IEEE Electronics Letters vol. 27 No. 14. Jul. 4, 1991.*
International search report for PCT/IB2010/002146 published as WO 2012/028896 A1.

(Continued)

*Primary Examiner* — James Hulka
(74) *Attorney, Agent, or Firm* — Anthony M. Del Zoppo, III; Driggs, Hogg, Daugherty & Del Zoppo, Co. LPA (57) ABSTRACT

An imaging transducer (302) includes a plurality of transducer elements (404, 604, 704, 804) arranged with respect to each other in an array along an long axis of the transducer, wherein an effective width of a transducer element of the transducer is equal to or greater than a center-to-center distance between adjacent transducer elements. A method includes acquiring data with an imaging transducer, wherein the transducer includes a plurality of transducer elements arranged with respect to each other in an array along an long axis of the transducer, wherein an effective width of a transducer element of the transducer is equal to or greater than a center-to-center distance between adjacent transducer elements.

22 Claims, 8 Drawing Sheets

(56) References Cited

U.S. PATENT DOCUMENTS

| | | | |
|---|---|---|---|
| 6,607,491 B2* | 8/2003 | Sato | G10K 11/02 |
| | | | 310/311 |
| 6,689,063 B1* | 2/2004 | Jensen | G01S 7/52046 |
| | | | 600/443 |
| 6,879,279 B2 | 4/2005 | Stappaerts | |
| 8,033,997 B2* | 10/2011 | Fiasca | G01S 7/52047 |
| | | | 600/407 |
| 2003/0060715 A1* | 3/2003 | Sato | G10K 11/02 |
| | | | 600/459 |
| 2004/0011134 A1* | 1/2004 | Sato | B06B 1/064 |
| | | | 73/632 |
| 2008/0110261 A1* | 5/2008 | Randall | A61B 8/4483 |
| | | | 73/592 |
| 2008/0146938 A1 | 6/2008 | Hazard et al. | |

FOREIGN PATENT DOCUMENTS

| | | | |
|---|---|---|---|
| JP | 2009-042173 | 2/2009 | |
| NL | EP 0440655 B1 * | 7/1994 | B06B 1/0622 |
| WO | 90/00792 A1 | 1/1990 | |

OTHER PUBLICATIONS

Smith et al., High-Speed Ultrasound Volumetric Imaging System—Part 1: Transducer Design and Beam Steering, IEEE Transactions on Ultrasonics, Ferroelectrics, and Frequency Control, Mar. 1991, pp. 100-108, vol. 38, No. 2.

Johnson et al., Array signal processing: concepts and techniques, 1993, 533 pages, PTR Prentice Hall, Englewood Cliffs, New Jersey (abstract attached).

Chiao et al., Aperture Formation on Reduced-Channel Arrays Using the Transmit-Receive Apodization Matrix, 1996, pp. 1567-1571, 1996 IEEE Ultrasoinics Symposium.

Lockwood, et al., Optimizing the Radiation Pattern of Sparse Periodic Two-Dimensional Arrays, IEEE Transactions on Ultrasonics, Ferroelectronics, and Frequency Control, Jan. 1996, pp. 15-19, vol. 43, No. 1.

Nikolov et al, Application of different spatial sampling patterns for sparse array transducer design, Ultrasonics, 2000, pp. 667-671, vol. 37.

Tezuka et al., A Two-Dimensional Array Probe that has a Huge Number of Active Channels, 2003 IEEE Ultrasonics Symposium, 2003, pp. 960-963.

* cited by examiner

IMAGING TRANSDUCER ARRAY

RELATED APPLICATION

This application is a national filing of PCT application Serial No. PCT/IB2010/002343, filed Sep. 20, 2010, published as WO 2012/038770 A1 on Mar. 29, 2012.

TECHNICAL FIELD

The following generally relates to an imaging transducer array and finds particular application to ultrasound (US) imaging; however, it is also amenable to non-ultrasound applications.

BACKGROUND

Figure 1:
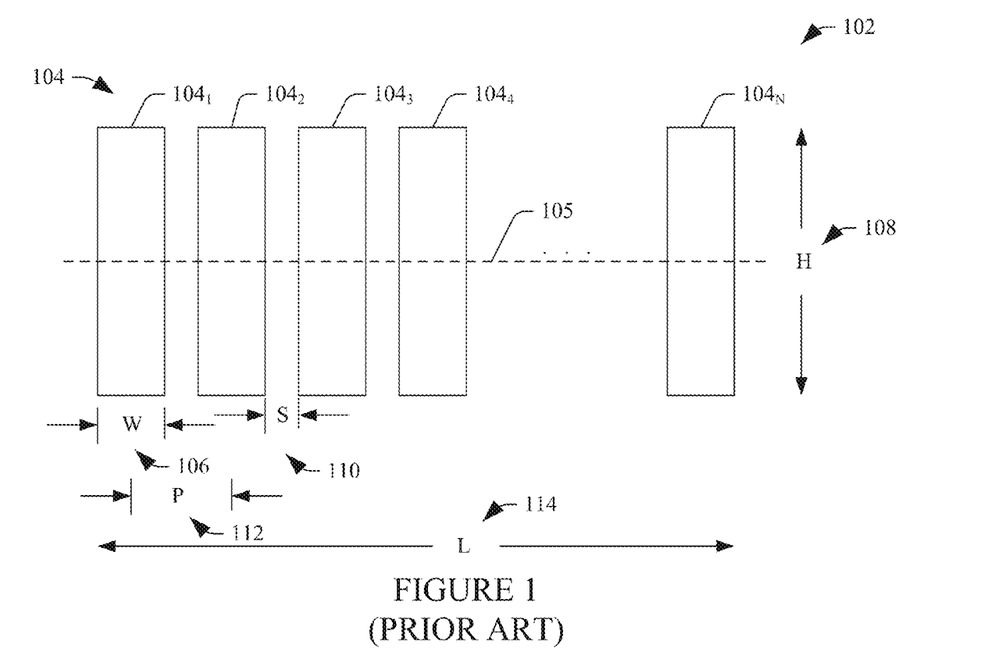
FIG. 1 illustrates a prior art 1D transducer.

Ultrasound probes include one-dimensional (1D) or two-dimensional (2D) transducer arrays. An example of one dimensional (1D) transducer 102 is illustrated in FIG. 1 and includes a plurality of generally rectangular shaped elements 104, such as elements $104_1$, $104_2$, $104_3$, $104_4$, ..., $104_N$ (where N is an integer equal to or greater than one), arranged consecutively along a long or longitudinal axis 105 of the one dimensional transducer 102. Each of the elements 104 has a physical width (W) 106 and a height (H) 108 and is separated from a neighboring element 104 by a spacing (S) 110 such as a kerf resulting from a dice-and-fill or other element forming approach.

The transducer array 102 has a pitch (P) 112, which, in this example, is defined by a center-to-center distance of neighboring elements 104 (e.g., $104_1$ and $104_2$) and is equal to a summation of half of a width of one of the neighboring elements, half of a width of the other neighboring element, and the spacing 110 between the neighboring elements (i.e., $P=\frac{1}{2}*W+\frac{1}{2}*W+S$). As such, in this example, the width 106 is always less than the pitch 112. The transducer array 102 has a length (L) 114, which is dependent on the number of elements 104, the width 106 and the spacing 110. Note that the illustrated geometry (e.g., width 106, height 108, spacing 110, pitch 112, and length 114) is for explanatory purposes and is not limiting.

Figure 2:
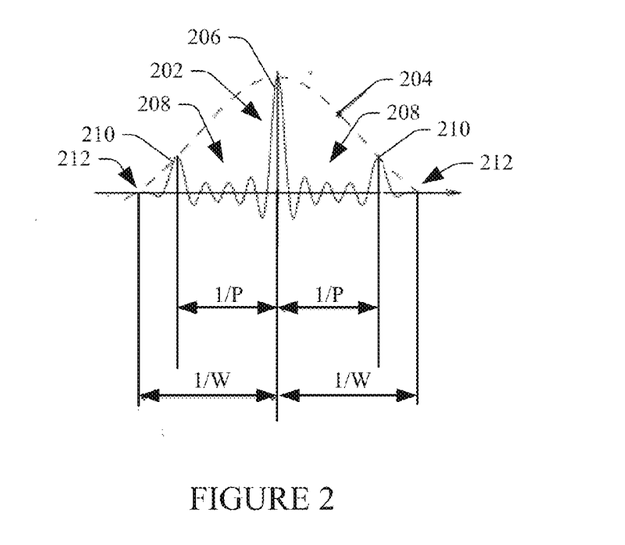
FIG. 2 illustrates an example radiation pattern for the transducer of FIG. 1.

With further reference to FIG. 1, and with reference to FIG. 2, an example radiation pattern 202 of the transducer array 102 in connection with an element factor 204 (which defines the imaging region or field of view of an element) for one of the elements 104 is shown as a function of the length 114 of the transducer 102 at a given distance away from the array 102 and focus. The radiation pattern 202 includes a main lobe 206, side lobes 208, and gating lobes 210. As shown, locations of zero crossings 212 of the element factor 204, with respect to the main lobe 206, are inversely proportional to the width 106 (e.g., ~1/W), and locations of the gating lobes 210, with respect to the main lobe 206, are inversely proportional to the pitch 112 (e.g., ~1/P).

With this configuration, the gating lobes 210 are located between the zero crossings 212 and the main lobe 206, and inside of the element factor 204 and hence in the field of view or imaging region of the element 104. Unfortunately, such grating lobes introduce artifacts into the images generated with the data acquired by the transducer 102. Examples of such artifacts include dark shadows inside of bright areas, shadows behind darker areas, ghost flow at the edges of vessel or in place of tissue where there are no vessels, and/or other artifacts.

One approach for reducing such artifacts is to reduce the pitch to avoid large grating lobes. This can be achieved through utilizing narrower width elements 104. Unfortunately, narrower elements have poorer signal-to-noise characteristics and a greater impendence mismatch with the cables interfacing the elements. Furthermore, a greater number of narrower elements, relative to wider elements, are needed for a given array aperture or length, and increasing the number of elements tends to increase the cost of the transducer array.

SUMMARY

Aspects of the application address the above matters, and others.

In one aspect, an imaging transducer includes a plurality of transducer elements arranged with respect to each other in an array along a long axis of the transducer, wherein an effective width of a transducer element of the transducer is equal to or greater than a center-to-center distance between adjacent transducer elements.

In another aspect, a method includes acquiring data with an imaging transducer, wherein the transducer includes a plurality of transducer elements arranged with respect to each other in an array along a long axis of the transducer, wherein an effective width of a transducer element of the transducer is equal to or greater than a center-to-center distance between adjacent transducer elements.

In another aspect, an ultrasound imaging system includes means for producing ultrasound signals such that an effective width of a transducer element of a transducer of the system is equal to or greater than a pitch of the transducer and means for processing the acquired ultrasound signals.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 3:
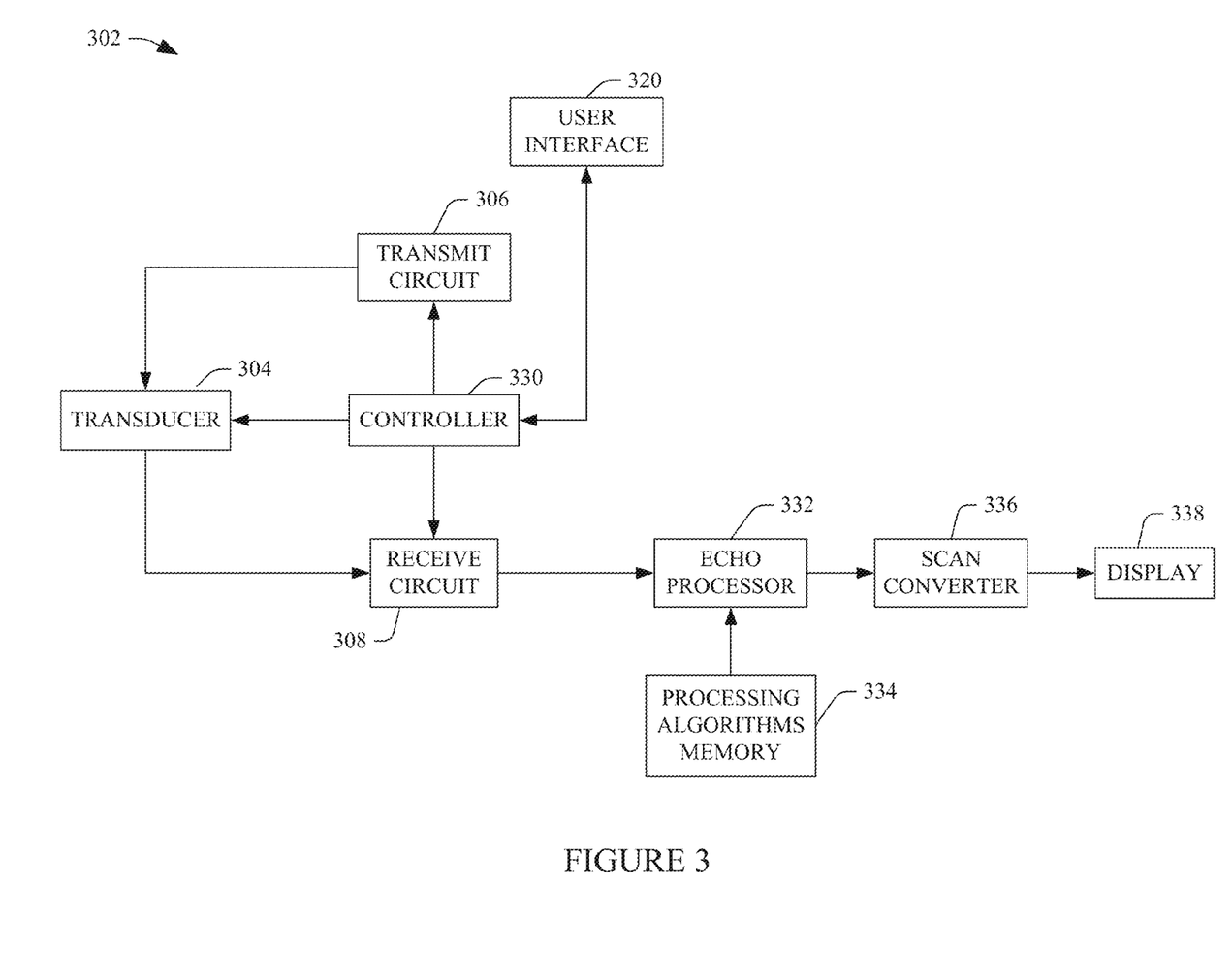
FIG. 3 illustrates an example imaging system.

FIG. 3 illustrates an imaging system 302 such as ultrasonic imaging system. The imaging system 302 includes a transducer 304, which can include a one-dimensional or a two-dimensional array of elements arranged in a linear, curved, circular, or other manner. The illustrated transducer 304 is configured so as to facilitate mitigating gating lobe artifact in images generated by the system. As described in greater detail below, this includes utilizing transducer elements with effective widths that are equal to or greater than a pitch (or center-to-center distance between neighboring elements) of the transducer 304. In one non-limiting instance, the effective widths are produced by spatially and/or temporally interleaving the elements and/or the data acquired thereby.

A transmit circuit 306 controls actuation of the elements of the transducer 304, which allows for steering and/or focusing the transmitted beam from predetermined origins along the array and at predetermined angles. A receive circuit 308 receives echoes received by the transducer 304. A controller 330 controls the transmit circuit 306 and/or the receive circuit 308. Such control may include, but is not limited to, identifying the scanning mode (e.g., A-mode, B-mode, C-plane, etc.), identifying the processing algorithm (e.g., synthetic aperture or non-synthetic aperture), moving the elements (e.g., electronically and/or physically) of the transducer 304 between acquisitions, initiating scanning, etc. The controller 330 also controls the transducer 304. This may include controlling an actuator for physically moving the elements between positions and/or a microprocessor for electronically moving the elements between positions.

An echo processor 332 variously processes the received data. Such processing may include beamforming (e.g., delaying and summing) the echoes into samples, and spatial compounding and/or other processing such as FIR filtering, IIR filter, etc., which may lower speckle and/or improve specular reflector delineation and/or other processing. As described in greater detail below, where a synthetic aperture algorithm is to be utilized, the processor 332 may also be configured to combine data from different acquisitions based on a corresponding synthetic aperture algorithm in processing algorithm memory 334 or elsewhere. The processor 332 may also employ an algorithm to synthesize sub-element data corresponding to a narrower pitch from element data.

A scan converter 336 scan converts the acquired data to generate data for display, for example, by converting the data to the coordinate system of the display. A display 338 and/or other display can be used to present the scan converted data. A user interface 320 includes various input and/or output devices for interacting with the controller 330 such as buttons, knobs, a keypad, a touch screen, etc. and/or visual and/or audible output devices.

As briefly discussed above, a suitable transducer 302 includes elements with effective widths that are equal to or greater than the pitch of the transducer 302. In one instance, this may be achieved interleaving sub portions of the elements in space (spatial interleaving) to produce effective elements widths that are equal to or greater than the pitch. This is illustrated in connection with FIGS. 4-7.

Figure 4:
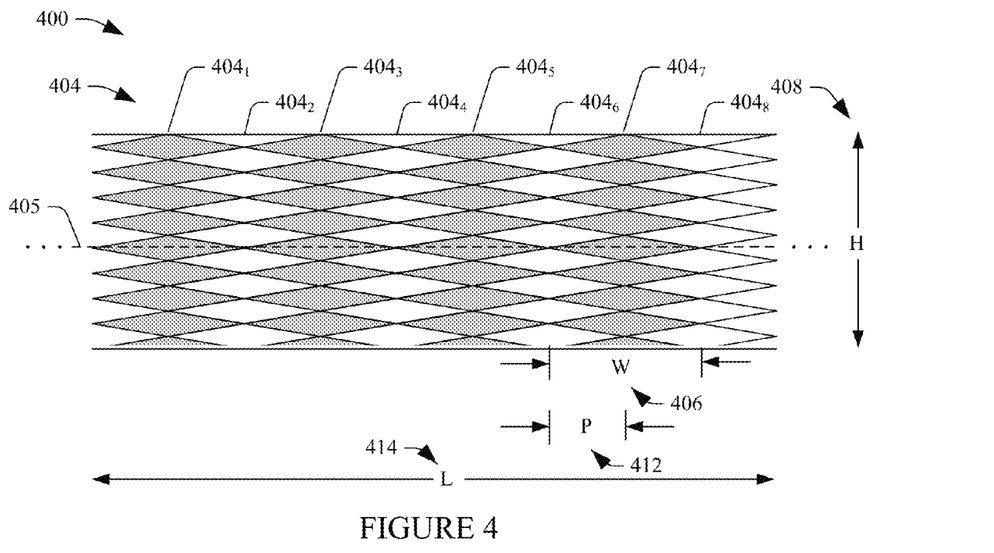
FIG. 4 illustrates an example imaging transducer configuration for the system of FIG. 3.

Initially referring to FIG. 4, a sub portion 400 of the transducer 302 includes elements 404, such as elements $404_1$, $404_2$, $404_3$, $404_4$, $404_5$, $404_6$, $404_7$, and $404_8$, which are arranged consecutively along a long or longitudinal axis 405 of the transducer 302. The transducer 302 may include a total of 16, 32, 64, 192, 384, and/or other number of the elements 404.

In the illustrated embodiment, each element 404 has a portion or protrusion protruding or extending in the direction of the long or longitudinal axis 405, and adjacent or neighboring elements 404 are arranged with respect to each other such that corresponding protrusions interleave. Furthermore, the transducer 302 has a length (L) 414 and a pitch (P) 412, and each of the elements 404 has an effective width (W) 406 (from protrusion end to protrusion end), which is larger than the pitch 412.

Figure 5:
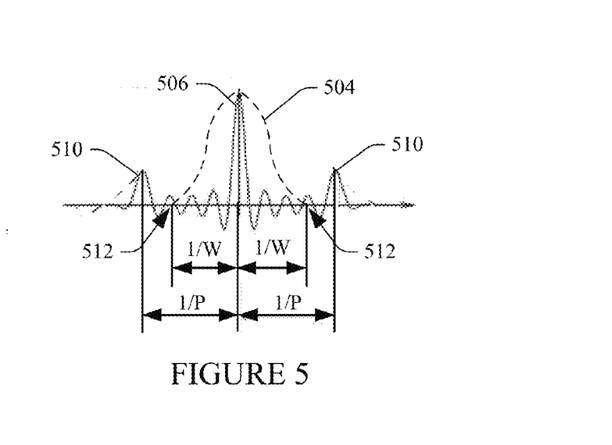
FIG. 5 illustrates an example radiation pattern for the transducer ay of FIG. 4.

As shown in FIG. 5, and with continued reference to FIGS. 3 and 4, with the width 406, an element 404 of the transducer 302 has an element factor 504 with zero crossings 512 that are closer to a main lobe 506 and between grating lobes 510 and the main lobe 506. As such, the grating lobes 510 are outside of the imaging field of view of the element 404. Another way to look at this is that by effectively increasing the width of the elements via the interleaved protrusions, the element factor 504 can be narrowed so that the gating lobes 510 fall outside of the element factor 504. As a consequence, relative to the element 104 (FIG. 1), grating lobe artifacts may be reduced for a given pitch.

In FIG. 4, the width 406 is about two times (2×) the pitch 412. In other embodiment, the effective width 406 may be larger or smaller than two times (2×) the pitch 412. In general, an element with a width which is an integer times the pitch will have an element factor with zero crossings that facilitate mitigating grating lobes.

Figure 6:
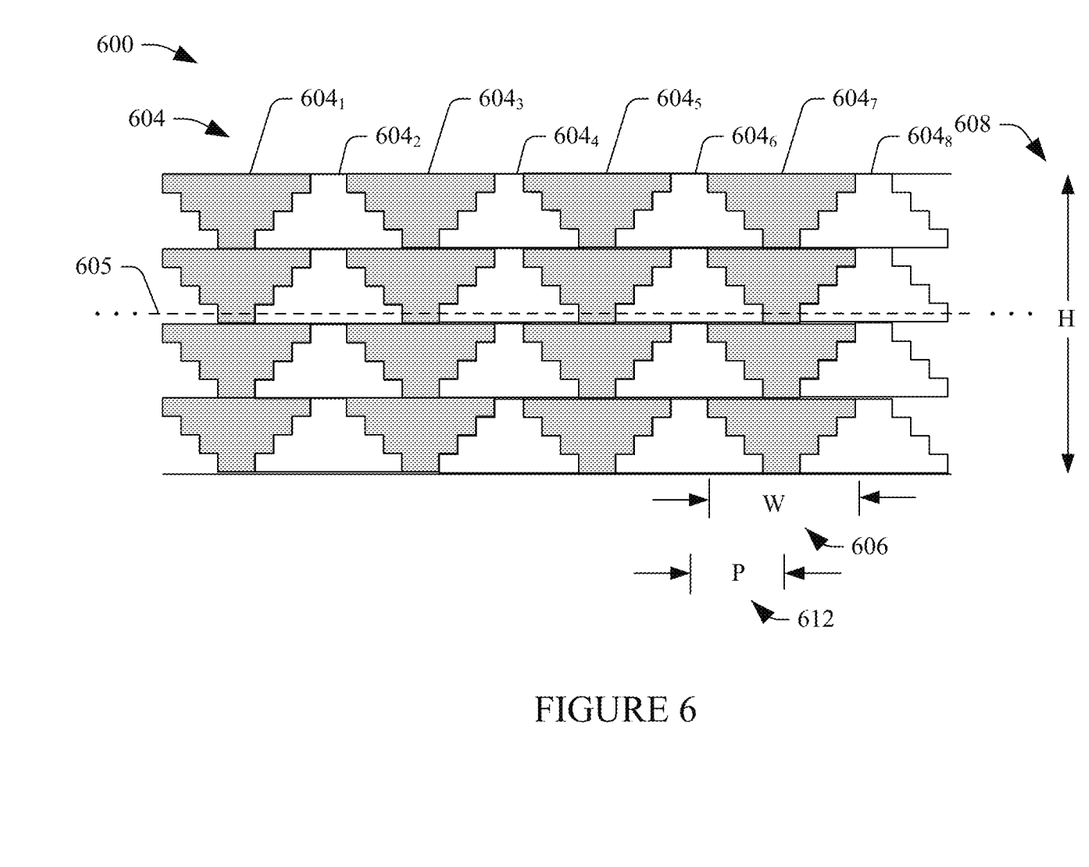
FIGS. 6-9 illustrate other example imaging transducer configurations for the system of FIG. 3.

Tuning to FIG. 6, a sub portion 600 includes elements 604, such as elements $604_1$, $604_2$, $604_3$, $604_4$, $604_5$, $604_6$, $604_7$, and $604_8$, which are arranged along a long or longitudinal axis 605 of the transducer 302. In this embodiment, an element 604 includes one or more stair case shaped sections in the direction of the longitudinal axis 605, and adjacent or neighboring elements 604 are arranged with respect to each other such that corresponding stair case shaped sections interleave. The transducer 302 has a pitch (P) 612, and each of the elements 604 has an effective width (W) 606, which is larger than the pitch 612 and, thus, the grating lobes are outside of the imaging field of view of the element 604.

FIGS. 4 and 6 illustrate two non-limiting examples with non-rectangular shaped elements where an effective width is greater than the transducer pitch. Other shapes are also contemplated herein. Technologies such as cMUT, thick film printing, piezo-composites, and the like can be used to produce elements with such shapes and/or other shapes in which the elements have effective widths that are larger than the pitches.

Figure 7:
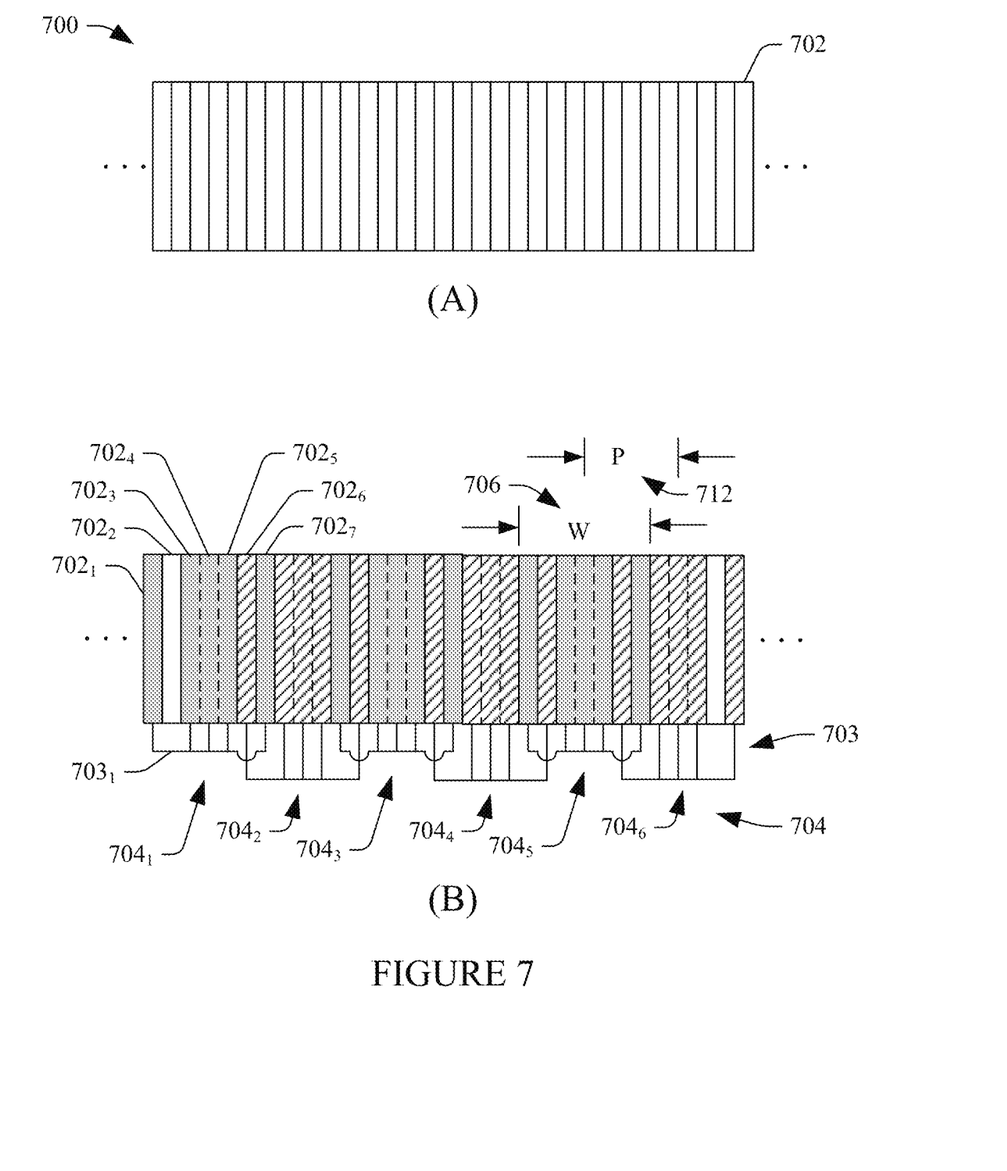

Tuning now to FIG. 7, FIG. 7A illustrates a sub portion 700 including a plurality of generally rectangular shaped sub-elements 702. FIG. 7B shows the sub portion 700 in a configuration in which different sub-elements 702, including non-contiguous sub-elements, are interleaved and electrically connected through different sets of electrical pathways 703 to form relatively larger elements 704, such as elements $704_1$, $704_2$, $704_3$, $704_4$, $704_5$, and $704_6$.

By way of example, the element $704_1$ includes sub-elements $702_1$, $702_3$, $702_4$, $702_5$, and $702_7$, which are interconnected through the electrical pathway $703_1$ and are interlaced with an unused sub-element $702_2$ and a sub-element $702_6$ of the neighboring element $704_2$. In the illustrated embodiment, the interleaved pattern is the same from element to element 704. In other embodiments, at least one of the elements 704 may be formed using a different pattern of interleaved sub-elements 702.

In the illustrated embodiment, the sub portion 700 includes substantially equal size sub-elements 702. In an alternative embodiment, the sub portion 700 may include two or more different size sub-elements. For example, the sub portion 700 may alternatively include two smaller sub-elements, such as $702_1$ and $702_2$, followed by a larger sub-element that is the size of the three sub-elements $702_3$-$702_5$, and this or another pattern can be repeated. Such sub-elements can be electrically connected to effectively provide the sub portion shown in FIG. 7(B) except that the three sub-elements $702_3$-$702_5$ would be replaced with a larger sub-element.

Like FIGS. 4 and 6, each of the elements $704_1$, $704_2$, $704_3$, $704_4$, $704_5$, and $704_6$ in FIG. 7B has an effective width (W) 706, which is larger than an actual width of combination of the sub-elements and a pitch (P) 712 of the transducer 302. As a result, the corresponding an element factor includes zero crossings that are between the grating lobes and the main lobe, and, thus the grating lobes are outside of the imaging field of view of the element 704.

Figure 8:
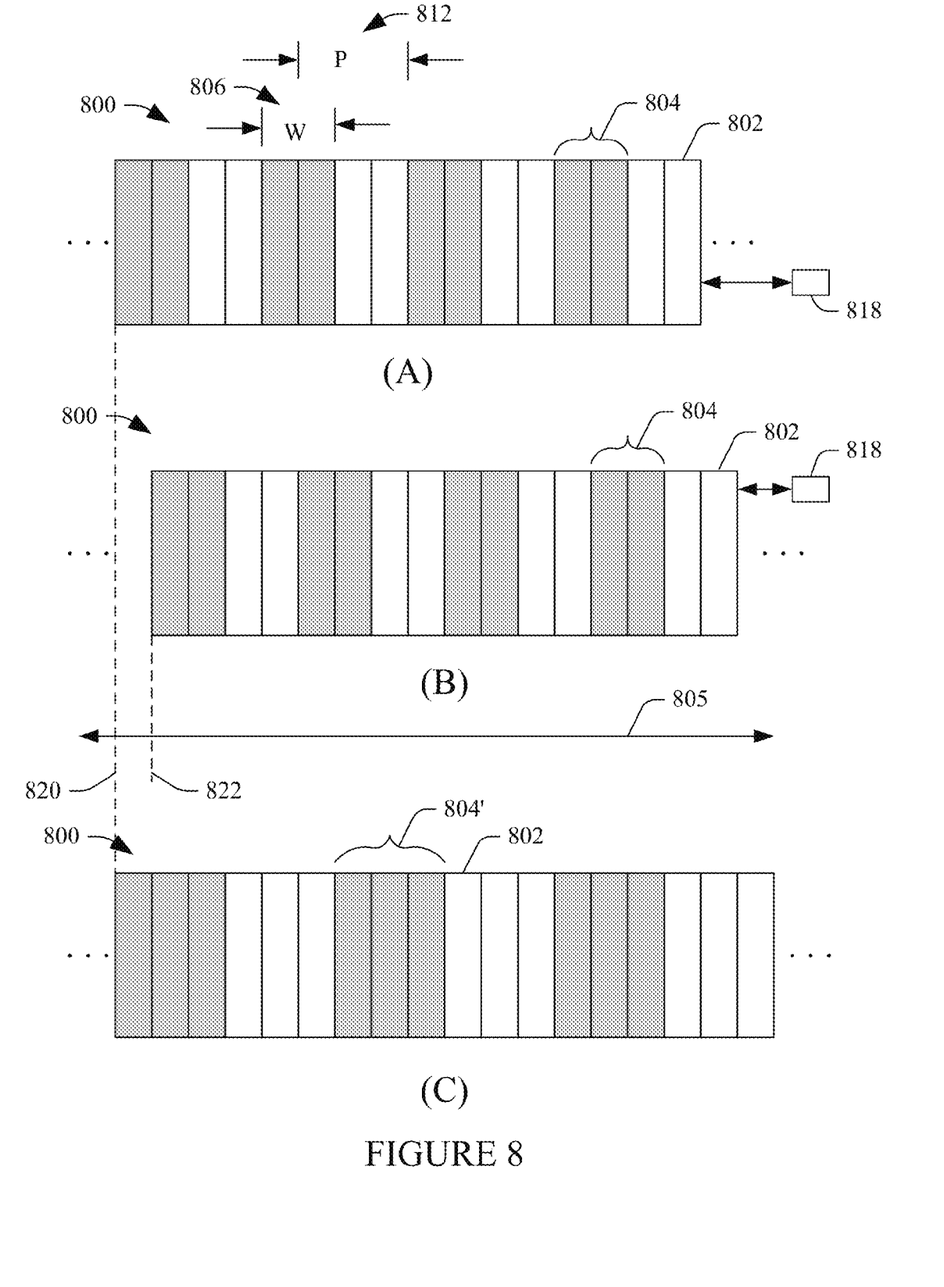
Figure 9:
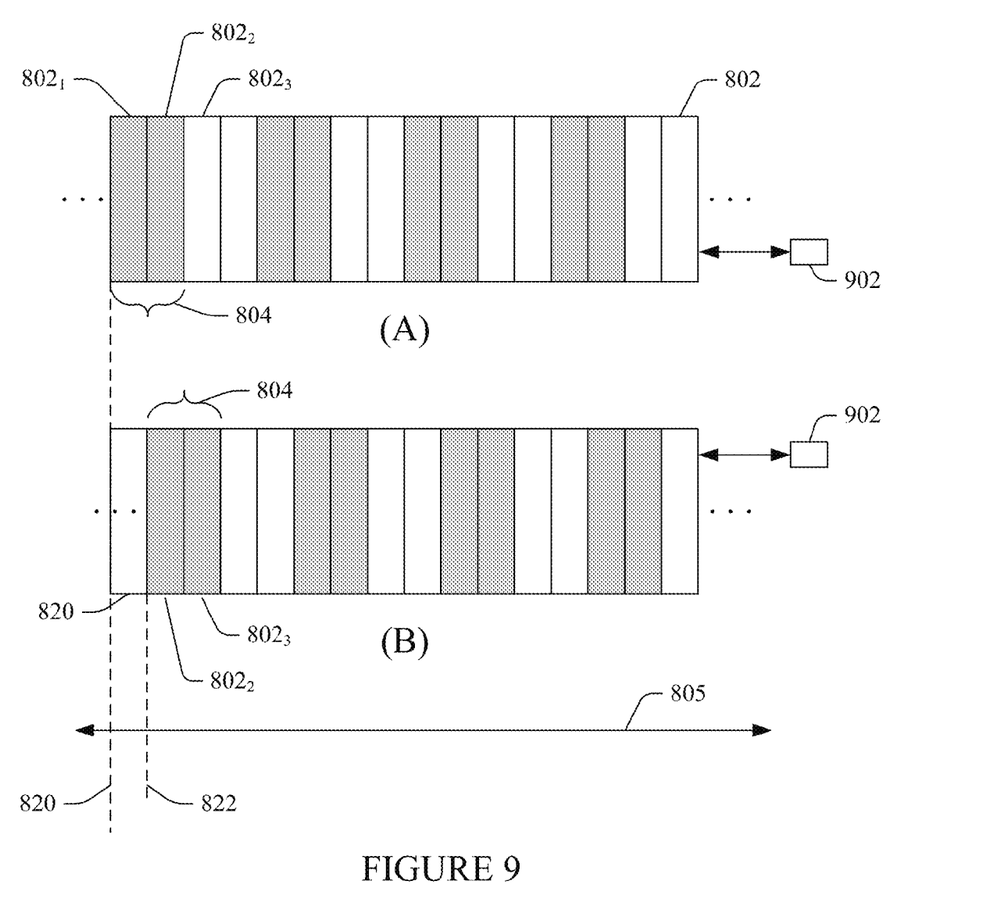

FIGS. 4-7 illustrate examples in connection with spatial interleaving. FIGS. 8 and 9 illustrate examples in connection with temporal interleaving (interleaving in time) to provide elements with effective widths that are equal to or greater than the pitch of the transducer 302.

FIGS. 8A and 8B illustrate an example of a sub portion 800 with elements 804. Each of the elements 804 includes multiple generally rectangular shaped sub-elements 802 in electrical communication. The elements 804 are configured to move at least between a first position 820 and a second position 822 along a long or longitudinal axis 805 of the transducer 302. FIG. 8A shows the sub portion 800 at the first position 820, and FIG. 8B shows the sub portion 800 at the second position 822.

With this embodiment, the same elements can be used for acquiring data at the two different the locations 820 and 822. A synthetic aperture algorithm can then be used to combine (e.g., weighted or un-weighted average) the acquired data to produce elements having an effective width that is greater than the pitch. In this example, the elements 804 are shifted one whole sub-element 802 (or half an element 804). As such, in one instance, an effective width 804' is about equal to the widths of three of the sub-elements 802 as shown in FIG. 8C.

In the illustrated embodiment, two sub-elements 802 form an element 804. In other embodiments, more or less than two sub-elements 802 form an element 804. In the illustrated embodiment, the elements 804 are shifted along the axis 805 by a width of one sub-element 802. In other embodiments, the elements 804 may be shifted by more or less than one sub-element 802.

Continuing with reference to FIG. 8, in one embodiment, the elements 804 are shifted between positions 820 and 822 through a mechanical approach. With this approach, the elements 804 are physically moved between positions 820 and 822 via an actuator 818 or the like. The elements 804 may be shifted between the positions 820 between data acquisition cycles (frames) or otherwise. An example of a suitable shift rate is on the order of one (1) to (25) millisecond (mS) and may be dependent on the frame rates (e.g., 10, 15, 25, 50, etc. frames per second) of the system so as to mitigate motion artifact. By physically moving the elements, the number of coaxes equals the number of elements and not the number of effective elements.

In another embodiment, the elements 804 are shifted between positions 820 and 822 through an electrical approach, as shown in FIG. 9. With this approach, a microprocessor 902 changes (e.g., via switches, etc.) the electrical pathways connecting the various groups of sub-elements 802 to form different sets of the elements 804. By way of example, FIG. 9A shows the elements 804 at the first position 820 in which the element 804 is formed with sub-elements $802_1$ and $802_2$, which are in electrical communication, and FIG. 9B shows the elements 804 at the second position 822 in which the element 804 is formed with sub-elements $802_2$ and $802_3$, which are in electrical communication.

In the examples above, the transducer 302 is illustrated with a linear array of elements. In other embodiments, the array can be curved. In yet another embodiment, the array may be circular, with a circular long axis. With a circular array transducer, the motion to shift the array between positions may be a small rotation of the array. With such a configuration, an array with more than 360 elements on a full circle can be obtained while having a physical array with half as many elements or even less.

In FIGS. 8 and 9, data from different acquisitions is combined to form elements with effectives widths that are greater than the pitch of the transducer. In another embodiment, sub-elements corresponding to a finer pitch can be synthesized from elements such that the element width and/or effective elements are equal to or greater than the finer pitch. In one instance, this can be achieved by subtracting partially overlapping apertures.

Figure 10:
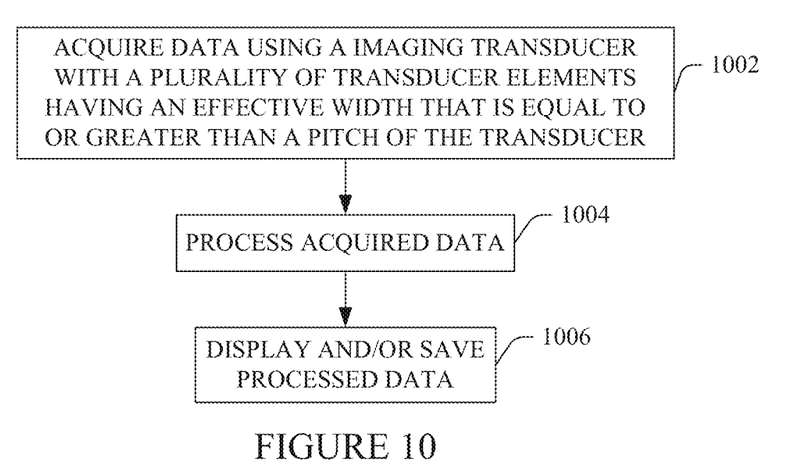
FIGS. 10 and 11 illustrate example methods.

FIG. 10 illustrates a method.

At 1002, data is acquired using an imaging transducer that includes a plurality of transducer elements having an effective width that is equal to or greater than a pitch of the transducer (center-to-center distance between adjacent transducer elements).

At 1004, the image data is optionally processed.

At 1006, the processed image data is saved and/or displayed.

Figure 11:
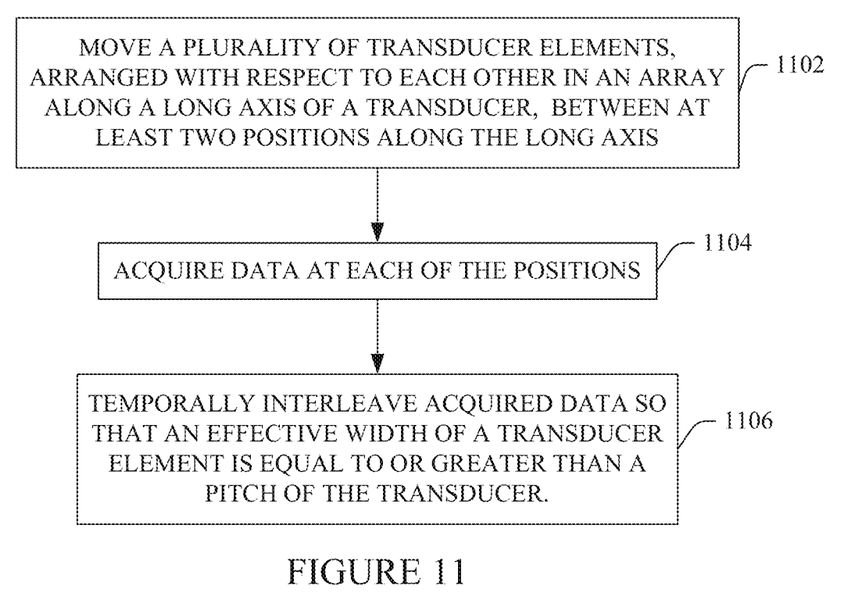

FIG. 11 illustrates another method.

At 1102, a plurality of transducer elements, which are arranged with respect to each other in an array along a long axis of a transducer, are moved between at least two positions along the long axis. As described herein, this can be done mechanically, electronically, and/or otherwise.

At 1104, data is acquired at each of the at least two positions.

At 1106, the acquired data is temporally interleaved so that an effective width of a transducer element is equal to or greater than a pitch of the transducer.

It is to be appreciated that the order of the method acts herein is provided for explanatory purposes and is not limiting. As such, one or more of the acts may occur in a different order. Furthermore, one or more of the acts may be omitted and/or one or more additional acts may be added.

It is to be appreciated that the methods herein may be implemented by one or more processors executing computer executable instructions stored, encoded, embodied, etc. on computer readable storage medium such as computer memory, non-transitory storage, etc. In another instance, the computer executable instructions are additionally or alternatively stored in transitory or signal medium.

Although various embodiments discussed herein are illustrated in connection with a one dimensional transducer, it is to be understood that the discussion herein also applies to multi-dimensional transducers such as a two dimensional imaging transducer.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. An imaging system, comprising:
 a plurality of transducer elements arranged with respect to each other in an array along a long axis of the transducer, wherein a width of each of the plurality of elements is less than the center-to-center distance;
 an actuator that physically moves the plurality of elements between at least two different positions along the long axis between data acquisition frames and a transducer element acquires data at the two different positions; and a processor that combines the acquired data from the transducer element from the at least the two different positions to generate an effective width for the transducer element of the transducer that is equal to or greater than a center-to-center distance between adjacent transducer elements.

2. The imaging system of claim 1, wherein the adjacent transducer elements are non-rectangular shaped transducer elements.

3. The imaging system of claim 2, wherein each of the non-rectangular shaped adjacent transducer elements includes at least one protrusion extending in a direction along the long axis and is arranged with respect to the other element such that the corresponding protrusions interleave.

4. The imaging system of claim 1, wherein the adjacent transducer elements each include a plurality of sub-transducer elements.

5. The imaging system of claim 4, wherein at least one of the sub-transducer elements of one of the adjacent transducer elements interleaves with the sub-transducer elements of another of the adjacent transducer elements along the long axis.

6. The imaging system of claim 5, further comprising:
a processor that spatially interleaves the data from the at least the two different positions to generate the effective width.

7. The imaging system of claim 1, wherein the transducer element includes two or more sub-transducer elements (802), and the transducer element is physically moved a distance approximately equal to a width of one of the sub-elements.

8. The imaging system of claim 1, wherein the actuator shifts the transducer element as a rate on the order of one to twenty-five milliseconds.

9. The imaging system of claim 1, wherein the effective width is about equal to the widths of three of the sub-elements.

10. The imaging system of claim 1, further comprising:
a microprocessor that electronically moves the plurality of elements between at least two different positions along the long axis.

11. The imaging system of claim 10, wherein the each of the elements includes a set of non-contiguous sub-elements that are interleaved in electrical communication, and the controller electronically switches the sub-elements in the sets of sub-elements to move the elements between the at least two different positions.

12. The imaging system of claim 1, wherein an initial pitch is larger than a width of the elements, and further comprising:
a processor that synthesizes a smaller pitch from the elements so that the effective width is equal to or greater than the smaller pitch.

13. The imaging system of claim 1, wherein the effective width is an integer times the smaller pitch.

14. The imaging system of claim 1, wherein an element factor of at least one of the elements includes a zero crossing that is positioned between gating lobes and main lobes of a radiation pattern of the transducer.

15. A method, comprising:
mechanically moving a plurality of transducer elements of an imaging transducer between at least two different positions along a long axis between data acquisitions frames;
acquiring data at each of the at least two different positions with the plurality of transducer elements; and
combining the acquired data from each transducer element at the at least two different positions to generate an effective width of a transducer element of the imaging transducer that is equal to or greater than a center-to-center distance between adjacent transducer elements.

16. The method of claim 15, wherein all of the elements have substantially a same width.

17. The method of claim 15, wherein the elements are non-rectangular.

18. The method of claim 15, wherein the elements are rectangular and include sub-elements, and sub-elements of neighboring elements are interleaved.

19. The method of claim 15, wherein the elements are rectangular and have physical widths that are less than the center-to-center distance.

20. The method of claim 15, wherein combining the data from the at least two positions includes interleaving the data.

21. The method of claim 15, further comprising:
generating an effective smaller pitch from the acquired data, wherein a width of the elements is larger than the center-to-center distance and smaller than the effective smaller pitch.

22. The method of claim 15, wherein the imaging transducer is linear, curved or circular.

* * * * *